D. A. ZURBRIGG.
MATRIX FOR USE IN TOOTH RESTORATION.
APPLICATION FILED MAY 7, 1917.
1,265,581.
Patented May 7, 1918.
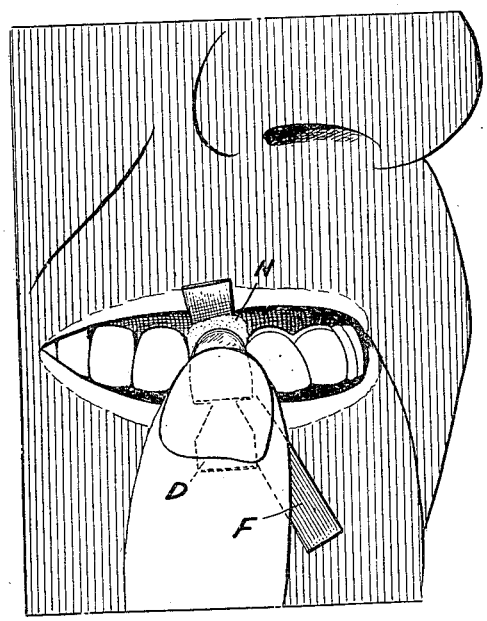
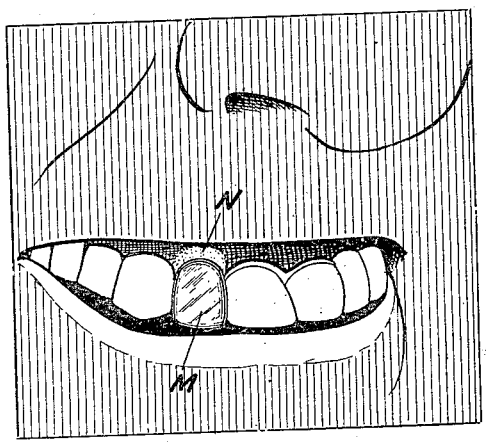
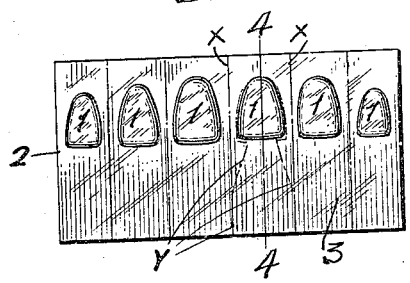
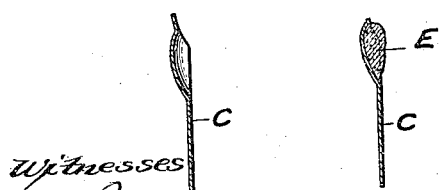
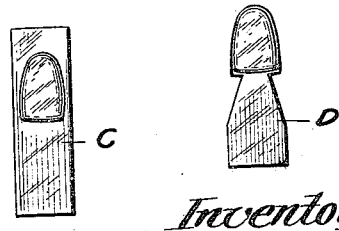
Inventor:
Daniel A. Zurbrigg

UNITED STATES PATENT OFFICE.

DANIEL ANTON ZURBRIGG, OF MILFORD, DELAWARE, ASSIGNOR TO THE L. D. CAULK COMPANY, OF MILFORD, DELAWARE, A CORPORATION OF DELAWARE.

MATRIX FOR USE IN TOOTH RESTORATION.

1,265,581.    Specification of Letters Patent.    Patented May 7, 1918.

Application filed May 7, 1917. Serial No. 167,018.

*To all whom it may concern:*

Be it known that I, DANIEL ANTON ZURBRIGG, a subject of the King of Great Britain, residing at Milford, in the county of Sussex and State of Delaware, U. S. A., have invented certain new and useful Improvements in Matrices for Use in Tooth Restoration, of which the following is a specification.

This invention relates to an improvement in matrices for use in tooth restoration.

The principal objects of the invention are to promote convenience and accuracy in the selection of the matrix, to facilitate its use, to promote convenience and the reduction of expense in its manufacture and sale; and to promote convenience in keeping an extensive stock of the matrices on hand.

One feature of the invention consists in forming a group of matrices as integral parts of a blank, thereby facilitating the selection of the matrix best adapted for forming the particular tooth or tooth facing in view, reducing expense in manufacture and promoting convenience in commercial handling.

Another feature of the invention consists in providing the matrix with a finger tab by which the matrix can be readily manipulated and which can be readily severed from the matrix when the tooth facing has been molded.

Another feature of the invention consists in providing a matrix which has a molding portion in the form of a shallow depression conforming, in size and outline to the front portion of a natural tooth for which an artificial facing is to be substituted, the said molding portion serving as a carrier for the cement used in the restoration and being employed in coöperation with the metal part of a bridge or other backing to effect the accurate location of the artificial facing relatively to the neighboring teeth and the molding of said facing in conformity, as regards size and outline, to the tooth for which said facing is to be substituted.

The accompanying drawings illustrate an embodiment of the invention.

In the said drawings:—

Figure 1 shows the application of the facing matrix and plastic cement to the backing.

Fig. 2 shows the matrix in position on the tooth when the cement has set.

Fig. 3 shows the blank from which the facing matrix is selected.

Fig. 4 is a sectional view on the line 4—4 of Fig. 3.

Fig. 5 is a sectional view showing the matrix filled with cement.

Fig. 6 is a view of the matrix untrimmed.

Fig. 7 is a view of the matrix trimmed or prepared.

Similar characters of reference designate corresponding parts throughout the several views.

The facing matrices correspond, generally, in outline and size to the tooth to be restored. As shown, they are in the form of shallow depressions and are provided with finger tabs for their manipulation.

As shown in Fig. 3 and preferred, a group of such matrices 1 are formed as integral parts of a blank 2. The matrices will be adapted for the superior and inferior centrals, laterals, cuspids, first and second bi-cuspids, and first, second and third molars. Various schemes of aggroupment may be employed. Thus, one blank may have its matrices severally intended for the different teeth enumerated but designed for a particular size and location of said teeth. On the other hand, and as preferred, the matrices of each blank will all be designed for some one tooth but will provide for different sizes and for the right and left of said tooth. Thus, the matrices of the blank shown in Fig. 3 may be assumed to be for superior laterals, the three matrices at the left being for the left lateral and the remaining three at the right for the right lateral, three sizes of laterals being thus provided for.

The blank 2 is preferably composed of transparent celluloid and its matrices are relatively stiff. The said matrices are preferably arranged in a row and along parallel axes, being suitably spaced to enable a strip, containing any desired matrix, to be cut from the blank along the imaginary lines Y without interference with the neighboring matrices. The blank is provided below the row of matrices with an extended plain portion 3 which furnishes the stock for the finger tabs by which the matrices are manipulated.

The use of the matrix herein disclosed with particular reference to Figs. 1 and 2, and described in succeeding paragraphs of the specification, is ancillary to the method which forms the subject of my co-pending application, Serial No. 167019 and to which method no claim is made in this present application.

The use of the matrices for the application of a tooth facing to a bridge, is briefly, as follows:—

The dentist first cuts from the blank 2 a vertical strip C (Fig. 6) having within its area the matrix desired and then cuts the matrix from said strip, leaving at its lower edge a finger tab D (Fig. 7). The matrix is then filled with cement E (Fig. 5) of the proper shade, which, by means of the matrix is applied to the backing (Fig. 1), the finger tab being used for any manipulation of the matrix necessary to the accurate centering and alinement of the facing. A suitable backing strip F is preferably held under the bridge while the cement is being applied. After the cement has set, the finger tab is cut from the matrix (Fig. 2) and after a suitable interval, the matrix is itself peeled from the facing, the excess cement N being then removed.

In some cases the matrix may also be used in the filling of cavities, the matrix being filled with the plastic material and pressed against the tooth to deposit the material in the cavity.

The material of the matrix is referred to in the foregoing description and in certain of the appended claims as "relatively stiff." By this expression I describe a material, such as sheet celluloid, which has such stiffness that it is capable of permanently retaining any definite form into which it may be molded or pressed.

I claim—

1. A matrix for use in tooth restoration composed of relatively stiff material which may be readily cut or trimmed and having a molding portion in the form of a shallow depression conforming in size and outline to the front portion of an actual tooth for which an artificial facing is to be substituted, the said molding portion serving as a carrier for the cement used in the restoration.

2. A matrix for use in tooth restoration having a molding portion in the form of a shallow depression conforming in size and outline to the front portion of a natural tooth for which an artificial facing is to be substituted and serving as a carrier for the cement used in the restoration, the said matrix having projecting from its molding portion a finger tab by which it may be readily manipulated and being composed of relatively stiff material which may be readily cut to enable the trimming of the molding portion and the severing of the tab.

3. A blank of relatively stiff material which may be readily cut and which is impressed with a plurality of tooth restoration matrices, said matrices being arranged in spaced relation to one another and each matrix differing in form from the others.

4. A blank having a plurality of tooth restoration matrices formed as integral parts thereof and arranged in a row at regular intervals, the blank having an extended plain portion parallel to said row and having its material selected to enable the severing from it of a strip carrying any desired matrix, without injury to the adjoining matrix.

In testimony whereof I have hereunto set my hand in presence of two subscribing witnesses.

DANIEL ANTON ZURBRIGG.

Witnesses:
W. G. SAMMONS,
W. S. DAUGHERTY.

Copies of this patent may be obtained for five cents each, by addressing the "Commissioner of Patents, Washington, D. C."